United States Patent
Knott (10) Patent No.: US 10,589,852 B2
(45) Date of Patent: Mar. 17, 2020

(54) APPARATUS AND METHOD FOR REMOVING MAIN ROTOR BLADES FROM MAIN ROTOR HUB YOKE

(71) Applicant: Textron Innovations Inc., Providence, RI (US)

(72) Inventor: Kevin Matthew Knott, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 110 days.

(21) Appl. No.: 15/940,289

(22) Filed: Mar. 29, 2018

(65) Prior Publication Data

US 2019/0300168 A1  Oct. 3, 2019

(51) Int. Cl.
    *B64F 5/50*      (2017.01)
    *B64C 27/48*      (2006.01)
    *B25B 5/00*      (2006.01)
    *B25B 5/02*      (2006.01)
    *B25B 5/10*      (2006.01)
    (Continued)

(52) U.S. Cl.
    CPC .............. *B64C 27/48* (2013.01); *B25B 5/003* (2013.01); *B25B 5/02* (2013.01); *B25B 5/10* (2013.01);
    (Continued)

(58) Field of Classification Search
    CPC ......... F03D 13/40; B25B 5/14; B64C 27/006; B64C 27/32; B64C 27/322; B64C 27/50;
    (Continued)

(56) References Cited

U.S. PATENT DOCUMENTS

| | | | | | |
|---|---|---|---|---|---|
| 4,301,982 A | * | 11/1981 | Tiemann | ................. | B64C 27/50 244/17.11 |
| 4,818,004 A | * | 4/1989 | Oswalt | ..................... | B66C 1/10 294/67.21 |

(Continued)

OTHER PUBLICATIONS

"RHUPIS Blade Clamp P/N 1006800, NSN 1615-01-562-8156, Instruction Manual," McNally Industries, AeroPrecision, downloaded from http://www.mcnally-group.com/mcnallyindustries/products/helicopter-tooling on Mar. 29, 2018, 13 pages.

(Continued)

*Primary Examiner* — Nathaniel E Wiehe
*Assistant Examiner* — Andrew J Marien
(74) *Attorney, Agent, or Firm* — Slater Matsil, LLP (57) ABSTRACT

An embodiment device includes a clamp body having a clamp opening, an extension opening and a traverse block having an internally threaded portion, a reaction plate having a recess in a first face at a first side of the reaction plate and one or more pins disposed in the recess extending away from the first face, and further having an extension extending along a long axis of the reaction plate through the extension opening, and bearing blocks disposed on a second side of the reaction plate opposite the first side, where the traverse block is disposed between the bearing blocks. An actuator is aligned parallel to the long axis of the reaction plate and extending through each of the bearing blocks and through the traverse block, and the actuator has an eternally threaded portion engaged with the internally threaded portion of the clamp body.

20 Claims, 11 Drawing Sheets

(51) Int. Cl.
*B25B 5/12* (2006.01)
*B64C 27/56* (2006.01)
*B25B 5/14* (2006.01)
*F03D 13/40* (2016.01)
*B62B 3/10* (2006.01)
*B64C 27/32* (2006.01)
*B64C 27/50* (2006.01)
*B64F 1/12* (2006.01)

(52) U.S. Cl.
CPC ................ *B25B 5/12* (2013.01); *B64F 5/50* (2017.01); *B25B 5/14* (2013.01); *B62B 3/10* (2013.01); *B64C 27/32* (2013.01); *B64C 27/322* (2013.01); *B64C 27/50* (2013.01); *B64C 27/56* (2013.01); *B64F 1/125* (2013.01); *F03D 13/40* (2016.05)

(58) Field of Classification Search
CPC ... B64C 3/56; B62B 3/10; B64F 1/125; B64F 5/50
See application file for complete search history.

(56) References Cited

U.S. PATENT DOCUMENTS

| | | | | |
|---|---|---|---|---|
| 6,213,712 | B1 * | 4/2001 | Muylaert | B64C 27/50 416/1 |
| 6,681,971 | B2 * | 1/2004 | Laverack | B60R 9/045 224/319 |
| 6,793,186 | B2 * | 9/2004 | Pedersen | B60R 9/048 224/309 |
| 6,860,450 | B2 * | 3/2005 | Muylaert | B64C 27/50 244/17.11 |
| 7,980,522 | B2 * | 7/2011 | Anderson | B25B 5/14 244/17.11 |
| 8,967,929 | B2 * | 3/2015 | Frederiksen | B60P 3/40 410/44 |
| 9,421,673 | B2 * | 8/2016 | Dunmire | B64C 27/006 |
| 9,989,098 | B2 * | 6/2018 | Jenkins | B64C 27/50 |
| 10,393,091 | B2 * | 8/2019 | Hancock | F03D 13/40 |
| 2004/0118970 | A1 | 6/2004 | Muylaert et al. | |
| 2009/0166498 | A1 | 7/2009 | Anderson et al. | |

OTHER PUBLICATIONS

"RUPHIS Blade Clamp," McNally Industries, Products and Programs, Helicopter Tooling, downloaded on Mar. 29, 2018 from http://www.aeroprecision.com/pdf/McNally_RUPHIS_Blade_Clamp_Instruction_Manual_pdf, 4 pages.

"The First Step to Shipping a Chopper? Remove the Blades," Smithsonian Channel, Youtube, XP054978761, retrieved from the internet on Oct. 9, 2018, URL:https://www.youtube.com/watch?v=YPqFWvSNOCc, Apr. 7, 2017, (see footage, whole document), 1 page.

* cited by examiner

APPARATUS AND METHOD FOR REMOVING MAIN ROTOR BLADES FROM MAIN ROTOR HUB YOKE

TECHNICAL FIELD

The present invention relates generally to a system and method for removing rotor blades from a rotor hub of an aircraft, and, in particular embodiments, to a system and method for clamping rotor blade and pressing the rotor blade into, or out of, a blade grip in a hub or yoke.

BACKGROUND

Generally, aircraft may be flown to a destination, however, it some cases, it may be more economical to transport an aircraft. For rotorcraft in particular, the bulk of the rotorcraft's size is created by the main rotor blades since the main rotor blades extend significantly past the fuselage of a rotorcraft. Thus, removal of a rotorcraft's main rotor blades for storage, or transport permits significant space savings.

SUMMARY

An embodiment device includes a clamp body having a clamp opening, an extension opening and a traverse block having an internally threaded portion, a reaction plate having a recess in a first face at a first side of the reaction plate and one or more pins disposed in the recess extending away from the first face, and further having an extension extending along a long axis of the reaction plate through the extension opening, and bearing blocks disposed on a second side of the reaction plate opposite the first side, where the traverse block is disposed between the bearing blocks. An actuator is aligned parallel to the long axis of the reaction plate and extending through each of the bearing blocks and through the traverse block, and the actuator has an eternally threaded portion engaged with the internally threaded portion of the clamp body.

An embodiment device includes a clamp body having a clamp opening, an extension opening, with the clamp body configured to clamp a rotor blade within the clamp opening. THE device further includes a reaction plate having an attachment structure disposed at a first face, the attachment structure configured to engage with a yoke of a rotorcraft along an axis perpendicular to a long axis of the reaction plate, and an actuator connected to the reaction plate and connected to the clamp body, where the actuator is configured to move the clamp body and the rotor blade with respect to the reaction plate when the actuator is engaged.

An embodiment method includes affixing a reaction plate of a blade clamp to a yoke of a rotorcraft, attaching a lower clamp section of a clamp body of the blade clamp around a rotor blade and to an upper clamp section that is of the clamp body and that is attached to the reaction plate, and engaging an actuator that is attached to the reaction plate and to the clamp body, the engaging the actuator causing the rotor blade to move with respect to the yoke.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A system and method for rotorcraft blade removal and installation is provided, according to some embodiments. In particular, the main rotor blades may be removed from, or installed in, the yoke or grip of the rotorcraft using a blade clamp that moves the main rotor blade into, or out of the yoke or grip. Thus, the blade clamp can be used to remove a main rotor blade from the yoke, or to insert the blade into the yoke. Since the main rotor blades have no handle or other structure for gripping the blade for removal, a clamp is used to grip the main rotor blade. An actuator is attached to a reaction plate, and extends or retracts along the long axis of the main rotor blade move the main rotor blade straight into, or out of, the yoke, avoiding damage to the main rotor blade. The reaction plate may have pins or other coupling structure that fit into bolt holes or other attachment structures, and extension or retraction of the actuator moves the reaction plate away from, or toward, the body of the clamp, which in turn, moves the main rotor blade away from the yoke.

Figure 1:
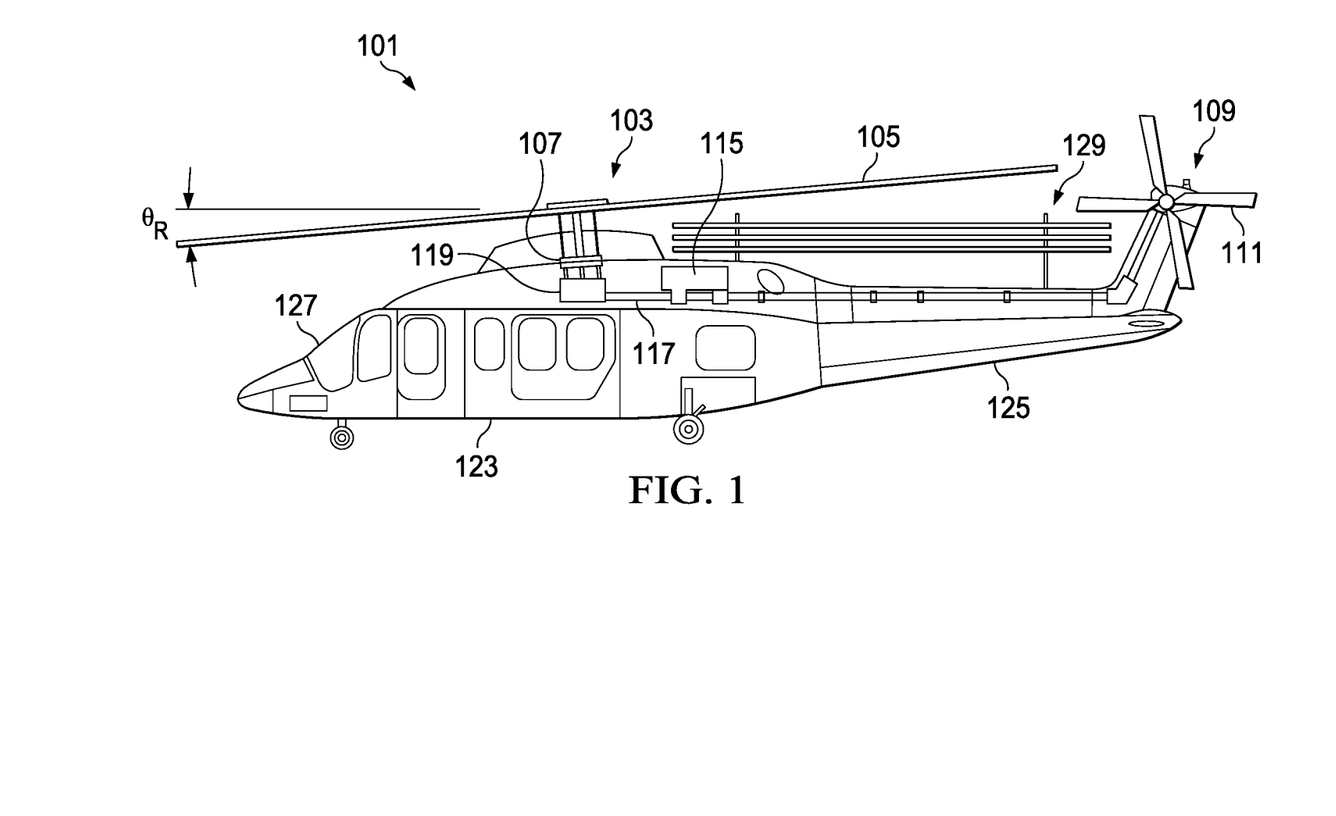
FIG. 1 illustrates a rotorcraft according to some embodiments.

FIG. 1 illustrates a rotorcraft 101, according to an embodiment. The rotorcraft 101 has a main rotor system 103, which includes a plurality of main rotor blades 105. The pitch of each main rotor blade 105 may be controlled by a swashplate 107 in order to selectively control the attitude, altitude, and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, a fly-by-wire (FBW) control system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engines 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 123 and a tail section 125. The tail section 125 may have other flight control devices such as horizontal or vertical stabilizers, rudder, elevators, or other control or stabilizing surfaces that are used to control or stabilize flight of the rotorcraft 101. The fuselage 123 includes a cockpit 127, which includes displays, controls, and instruments.

The main rotor system 103 has a longitudinal tilt $\theta_R$ with respect to a longitudinal axis of the rotorcraft 101. In an embodiment, the longitudinal tilt $\theta_R$ is about 5 degrees. The longitudinal tilt $\theta_R$ is a forward tilt that permits the rotorcraft 101 to remain relatively level when the rotorcraft 101 is moving forward, or in a longitudinal direction. However, the longitudinal tilt $\theta_R$ of the main rotor system 103 results in the tips of the main rotor blades 105 being angled away from the tail section 125, and prevents the blades from being folded backwards and secured to the boom while still attached to the central mast of the main rotor system 103.

With such an arrangement, the main rotor blades 105 may need to be fully removed for transport or storage of the rotorcraft 101. In some embodiments, a rotor blade storage rack 129 may be attached to the fuselage 123 and the tail section 125. One or more of the main rotor blades 105 may be removed from the main rotor system 103 and stored on the rotor blade storage rack 129 when the rotorcraft 101 is not in use. For example, all of the main rotor blades 105 may be removed and stored in the rotor blade storage rack 129. Alternatively, some of the main rotor blades 105 may be removed and stored in the rotor blade storage rack 129, while others are attached to the rotorcraft 101. It should be appreciated that even though rotorcraft 101 is depicted as having certain illustrated features, the rotorcraft 101 may have a variety of implementation-specific configurations. For instance, in some embodiments, the cockpit 127 is configured to accommodate a pilot or a pilot and co-pilot, as illustrated. It is also contemplated, however, that rotorcraft 101 may be operated remotely, in which case the cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case the cockpit 127 could be eliminated entirely in order to save space and cost.

The main rotor blades 105 are substantially unwieldy, and cannot be manually removed by a single person. The length and weight of the main rotor blades 105 are greater than a single person can manage. Additionally, the main rotor blades 105 are secured in a yoke of the main rotor system 103, and must be removed from the yoke without damaging the mating surfaces.

Figure 2:
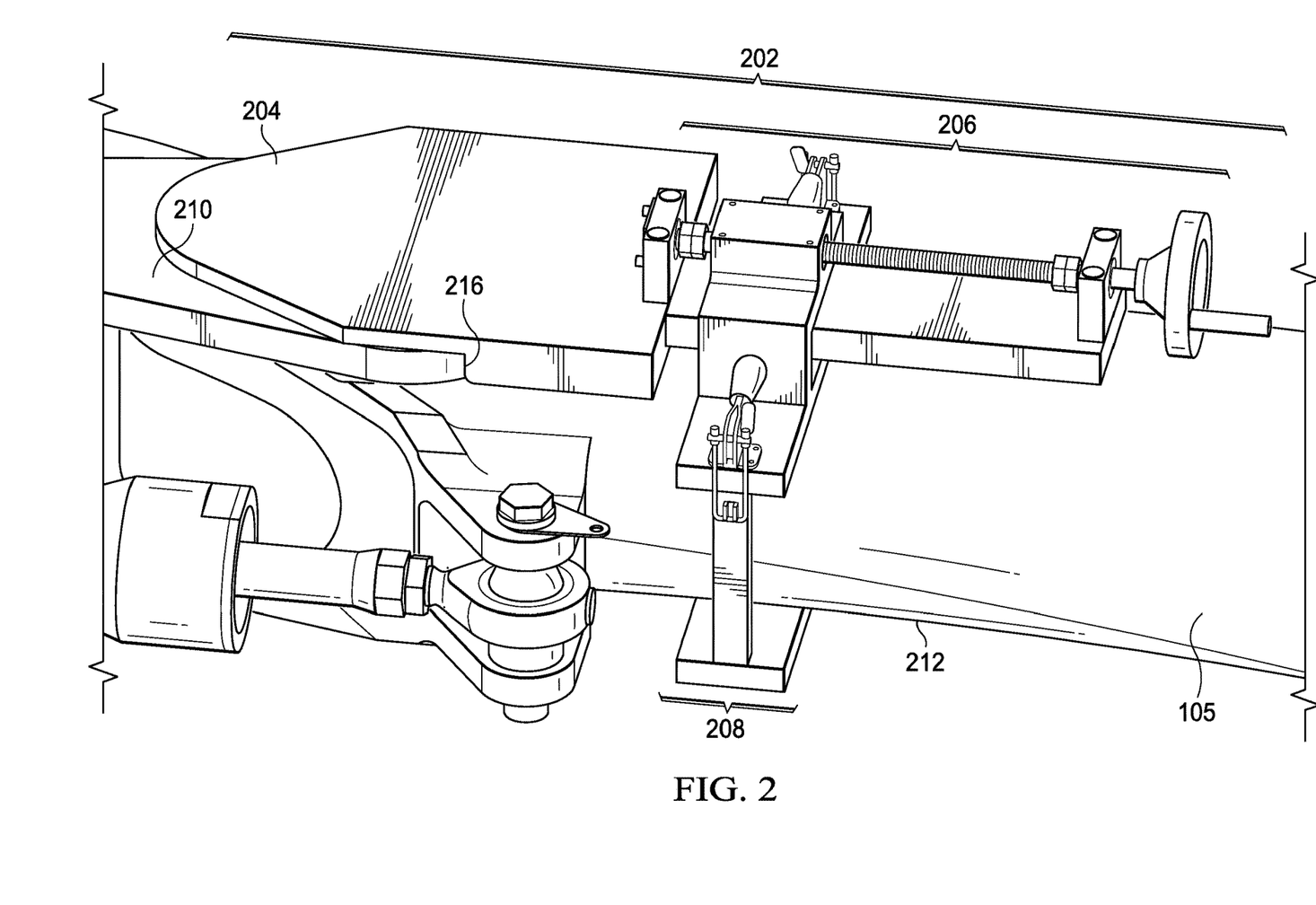
FIG. 2 illustrates a blade clamp installed on a main rotor blade according to some embodiments.

FIG. 2 illustrates a blade clamp 202 installed on a main rotor blade 105 according to embodiments. The blade clamp 202 has a reaction plate 204 that engages a yoke 210. A lip 216 of the reaction plate 204 engages an edge of the yoke 210 to permit the blade clamp 202 to securely push the main rotor blade 105 out of the yoke 210. A clamp body 208 is secured around a portion of the main rotor blade 105. An actuator 206 is attached to the reaction plate 204, and passes through the clamp body 208. Engaging the actuator 206 by, for example, extending or retracting the actuator 206, moves the reaction plate 204 with respect to the clamp body 208, and moves main rotor blade 105 away from, or toward, the reaction plate 204.

Figure 3:
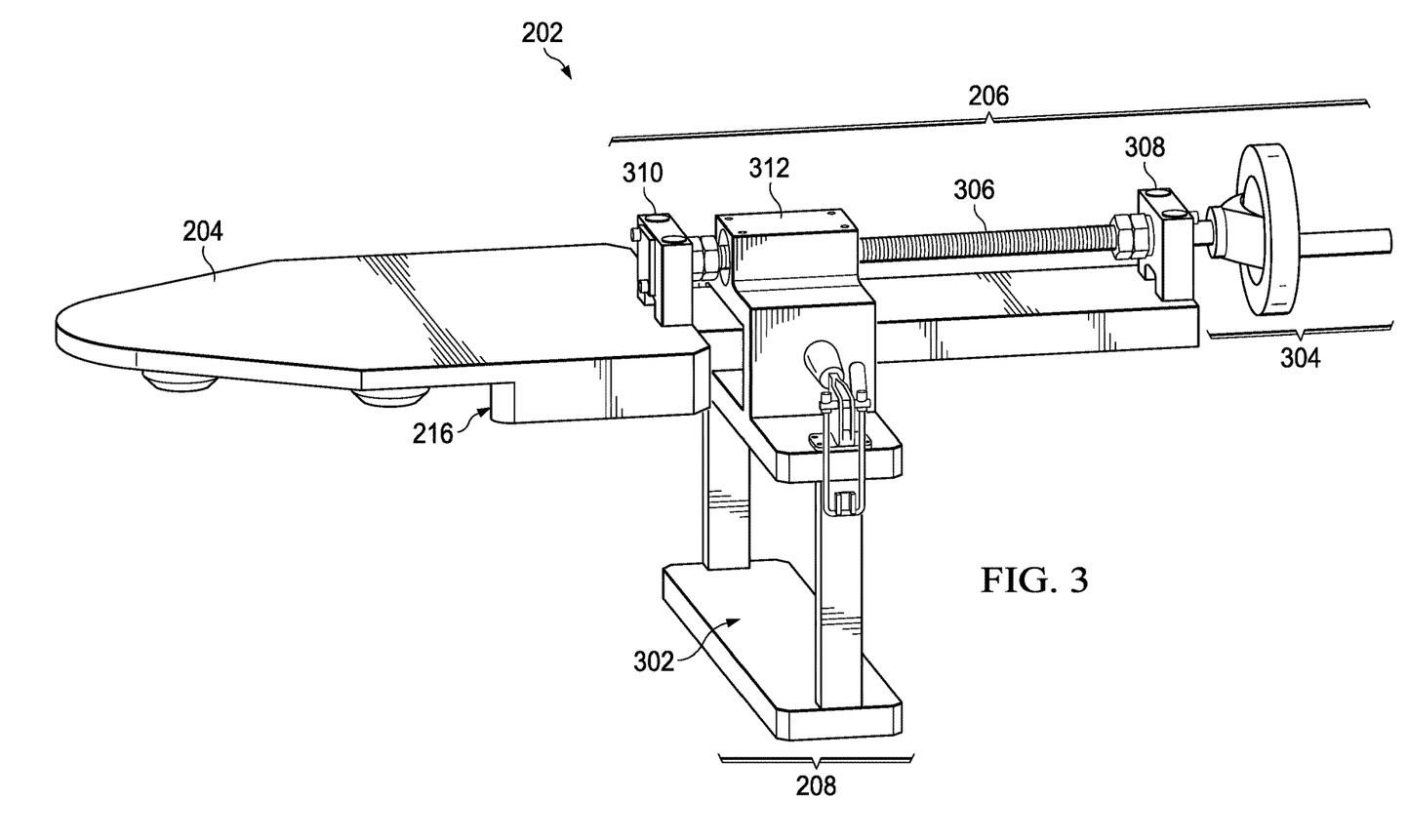
FIG. 3 is a perspective view illustrating a blade clamp according to some embodiments.

FIG. 3 is a perspective view illustrating a blade clamp 202 according to some embodiments. In some embodiments, the blade clamp 202 has an actuator 206 that is a manual screw advance actuator 206. A screw advance actuator 206 moves the reaction plate 204 in relation to the clamp body 208 by turning the actuator 206, and a manual screw advance actuator 206 is manually rotated by, for example, a handwheel 304, to move the reaction plate 204. In another embodiment, the actuator 206 may be rotated and advanced using a powered system. For example, the actuator 206 may have a drive screw or bolt head instead of a handle, and may be driven by a powered screw gun, driver or drill with a socket that engages the drive screw or bolt head. In other embodiments, the actuator 206 may be a screw advance actuator 206 that is automatically rotated, by, for example, an electric motor, a hydraulic or pneumatic motor, or by another a mechanism that drives or otherwise rotates the actuator 206. In yet other embodiments, the actuator 206 may be linearly moved and driven, by, for example, a piston, a lever, a linear actuator or linear motor, or the like. Embodiments of the blade clamp 202 are described herein in terms of a manual screw advance actuator 206, however, the described blade clamp 202 is not limited to such embodiments, as the actuator 206 may be moved using a system selected by one of skill in the art to address the requirements of the application to which the blade clamp 202 is applied.

The actuator 206 is attached to the reaction plate 204 by one or more bearing blocks 308 and 310. In some embodiments, the bearing blocks 308 and 310 are retaining structures such as pillow blocks, bushings, bearing holders, brackets or the like that hold a shaft 306 of the actuator 206 to the reaction plate 204 while permitting the actuator 206 to turn freely.

A traverse block 312 is attached to the clamp body 208, and in some embodiments, is integrated into the clamp body 208 and may be disposed between the bearing blocks 308 and 310. The traverse block 312 is driven by the shaft 306 to move the clamp body 208 in relation to the actuator 206 and reaction plate 204. In embodiments where the actuator 206 is a screw advance actuator 206, the traverse block 312 may be a nut block or have an internally threaded portion that engages with an externally threaded portion of the shaft 306 so that rotating the shaft 306 advances the traverse block 312 and moves the clamp body 208. The clamp body 208 has a clamp opening 302 in which a rotor blade may be disposed. Thus, as the clamp body 208 is moved, a rotor blade clamped in the clamp opening 302 is moved.

Figure 4:
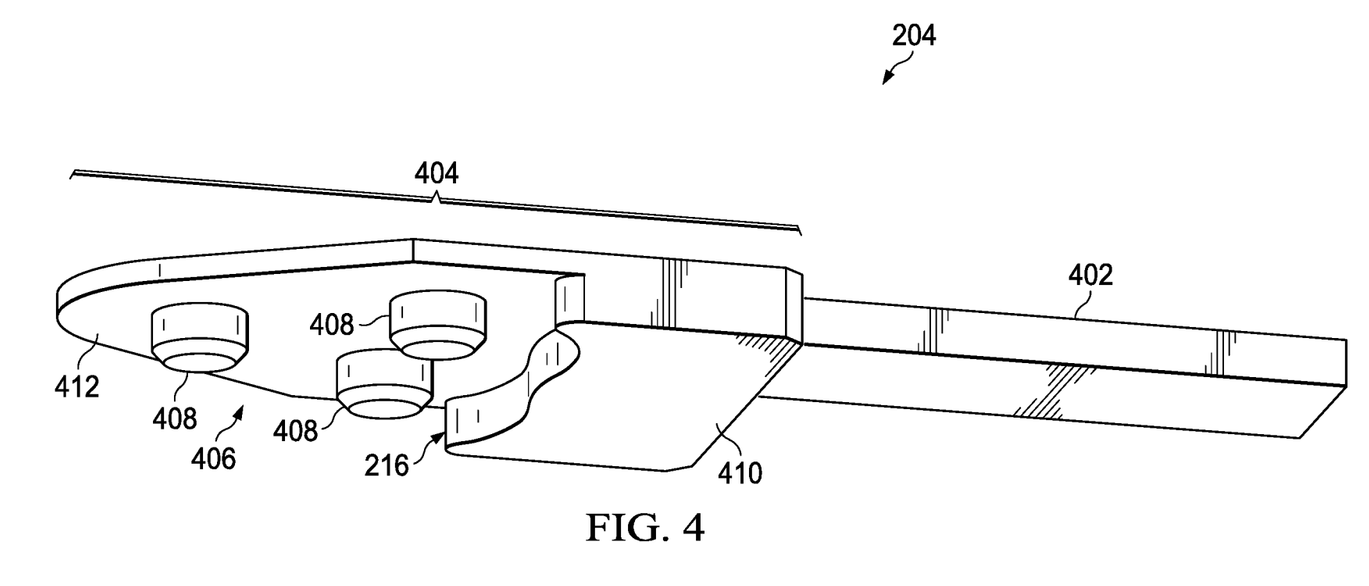
FIG. 4 is a perspective view illustrating a reaction plate according to some embodiments.

FIG. 4 is a perspective view illustrating a reaction plate 204 according to embodiments. In some embodiments, the reaction plate 204 has an extension 402 that engages with a clamp body to keep the reaction plate 204 aligned with the clamp body. The extension 402 is attached to a connection section 404 that engages with a yoke when a rotor blade is moved. The connection section 404 has press section 410, and the lip 216 forms an edge of the press section 410 on the opposite side of the press section from the extension 402.

The connection section 404 further has a recess face 412. A recess 406 is formed by the recess face 412 being offset from a face of the press section 410. One or more pins 408 are disposed on the recess face 412 spaced apart from the lip 216, and extend into the recess 406. In some embodiments, the pins 408 are substantially round. The pins 408 may be configured to engage with one or more bolt holes on a yoke, and the pins 408 may be provided with a round pin shape so that the pins 408 are able to apply pressure to the yoke when the reaction plate 204 is extended and also when the reaction plate 204 is retracted.

In other embodiments, the pins 408 may be hexagonal, square or another shape that securely engages with the yoke. In yet other embodiments, retaining clips, ridges, or other structures may be used to secure the reaction plate 204 to the yoke. For example, a ridge or other structure may engage an outer edge of the yoke, for example, along a side or back side of the yoke, and may be used where the yoke is free of bolt holes, where the bolt holes are tapered, rounded, or where pins 408 would otherwise not make secure contact.

Figure 5A:
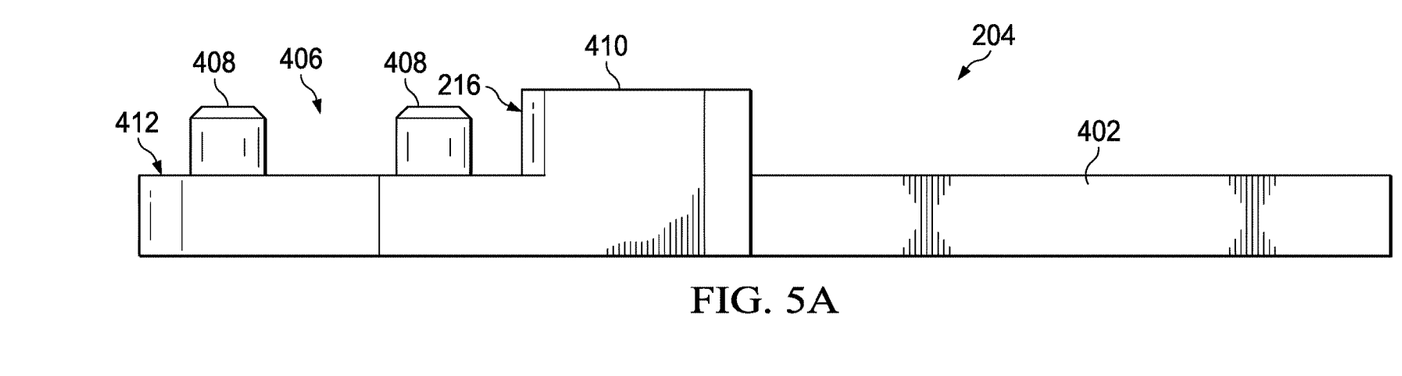
FIG. 5A is a side view illustrating a reaction plate according to some embodiments.

FIG. 5A is a side view illustrating a reaction plate 204 according to embodiments. In some embodiments, the lip 216 is substantially perpendicular to the recess face 412. The extension 402 extends along a direction that is substantially parallel to the recess face 412 so that, as the actuator moves, the clamp body and blade are moved moves along a direction parallel to the recess face 412. The pins 408 may have chamfered edges. Additionally, a portion of side of the pins 408 may be substantially perpendicular to the recess face 412 so that, as the actuator moves, sides of the pins 408 perpendicular to the motion of the rotor blade apply pressure to the yoke in a direction parallel to the recess face 412 and the extension 402.

Figure 5B:
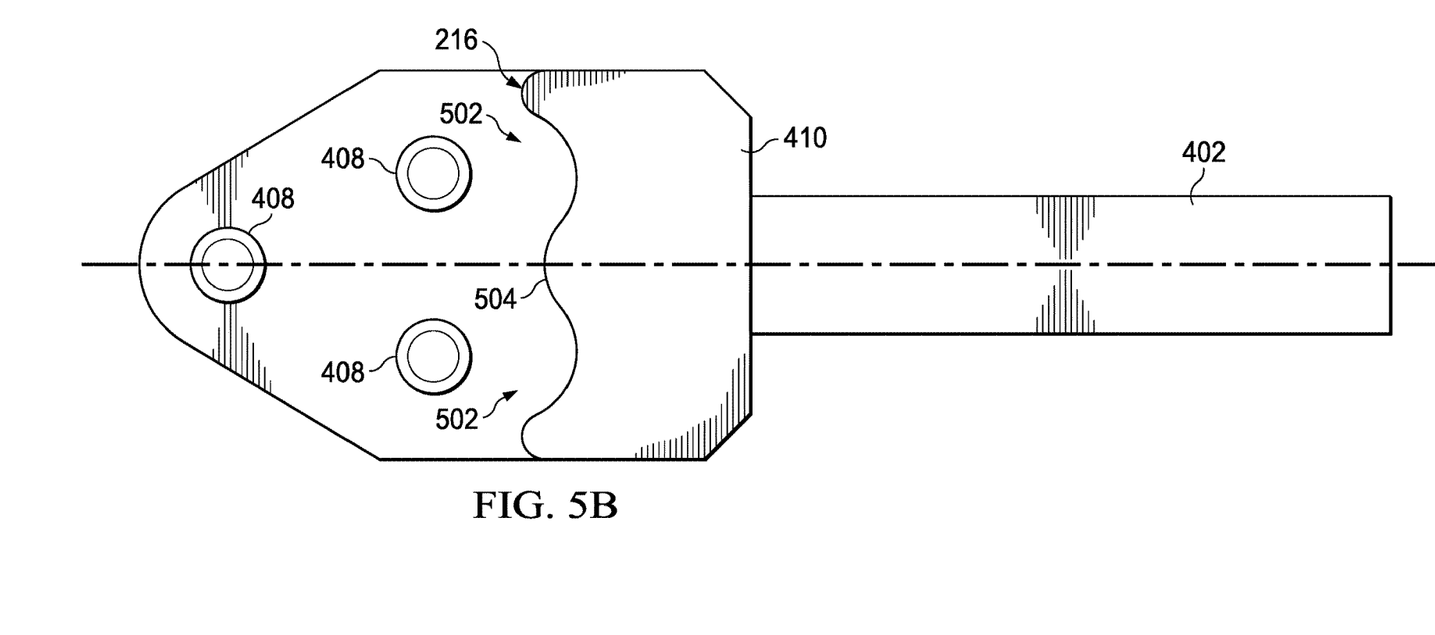
FIG. 5B is a top view illustrating a reaction plate according to some embodiments.

FIG. 5B is a top view illustrating a reaction plate 204 according to embodiments. The lip 216 may be contoured with a shape that conforms to an edge of the yoke to evenly apply pressure to the yoke edge as the reaction plate 204 is moved. Thus, the lip 212 may contact a front edge of the yoke while the recess face 412 contacts a top surface of the yoke and pins extend into holes in the yoke.

In some embodiments, the lip 216 may be contoured to have a curve. The lip 216 may have coves 502 that are each associated with a pin 408, and that are separated by a lobe 504, where each of the pins 408 may be substantially centered in a respective cove 502.

Figure 6A:
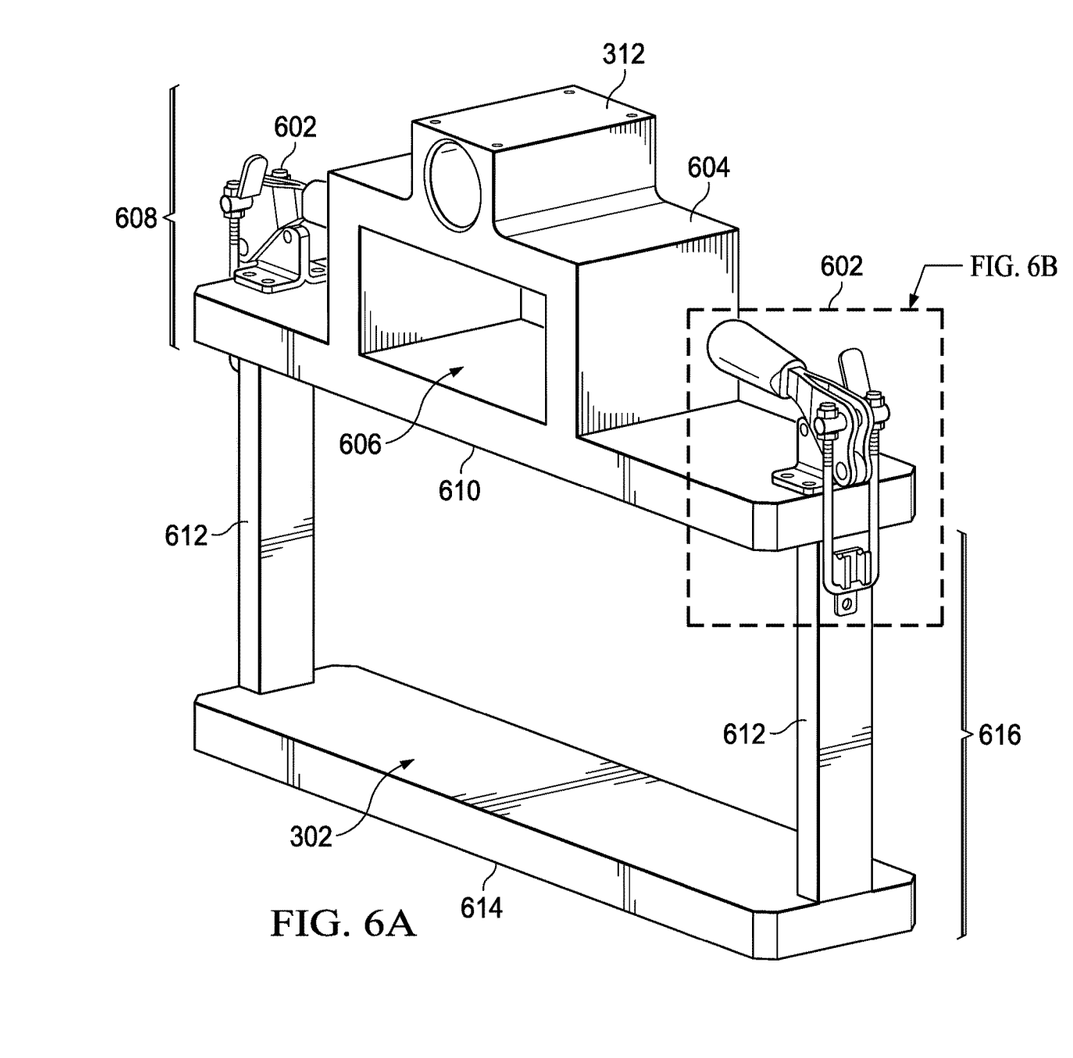
FIG. 6A is a perspective view illustrating a clamp body according to some embodiments.

FIG. 6A is a perspective view illustrating a clamp body 208 according to embodiments. The clamp body 208 has a lower clamp section 616 that is secured to an upper clamp section 608 by one or more attachment structures such as clamp latches 602. The clamp latches 602 may be affixed to edges of an upper clamp plate 610 of the upper clamp section 608. The clamp latches 602 may attach to, or otherwise engage with, side clamp plates 612 of the lower clamp section 616 to retain the lower clamp section 616 against the upper clamp section 608. In other embodiments, the attachments structures may be straps, clips, bolts or another system for securing the lower clamp section 616 against the upper clamp section 608.

In some embodiments, the upper clamp section 608 further has a support block 604 disposed on an upper side of the upper clamp plate 610. In some embodiments, the traverse block 312 is disposed on an upper side of the support block 604, and an extension opening 606 may be disposed between the traverse block 312 and upper clamp plate 610. The support block 604 and upper clamp plate 610 bound the extension opening 606, which provides an opening though which the extension 402 of the reaction plate 204 is moved when the reaction plate 204 is moved. The extension opening 606 provides support for the extension 402, keeping the reaction plate 204 aligned with the clamp body 208, and ensuring that the reaction plate 204 moves substantially perpendicular to the clamp body 208.

In some embodiments, the lower clamp section 616 has side clamp plates 612 that are attached to opposite ends or edges of the lower clamp plate 614 and that extend from an upper surface of the lower clamp plate 614. The side clamp plates 612 and lower clamp plate 614 form a U or C shaped structure, and when the lower clamp section 616 is secured to the upper clamp section 608, the side clamp plates, upper clamp plate 610 and lower clamp plate 614 bound the clamp opening 302. Attaching the lower clamp section 616 to the upper clamp section 608 allows at least the upper clamp plate 610 and lower clamp plate 614 to clamp opposing surfaces of a rotor blade.

Figure 6B:
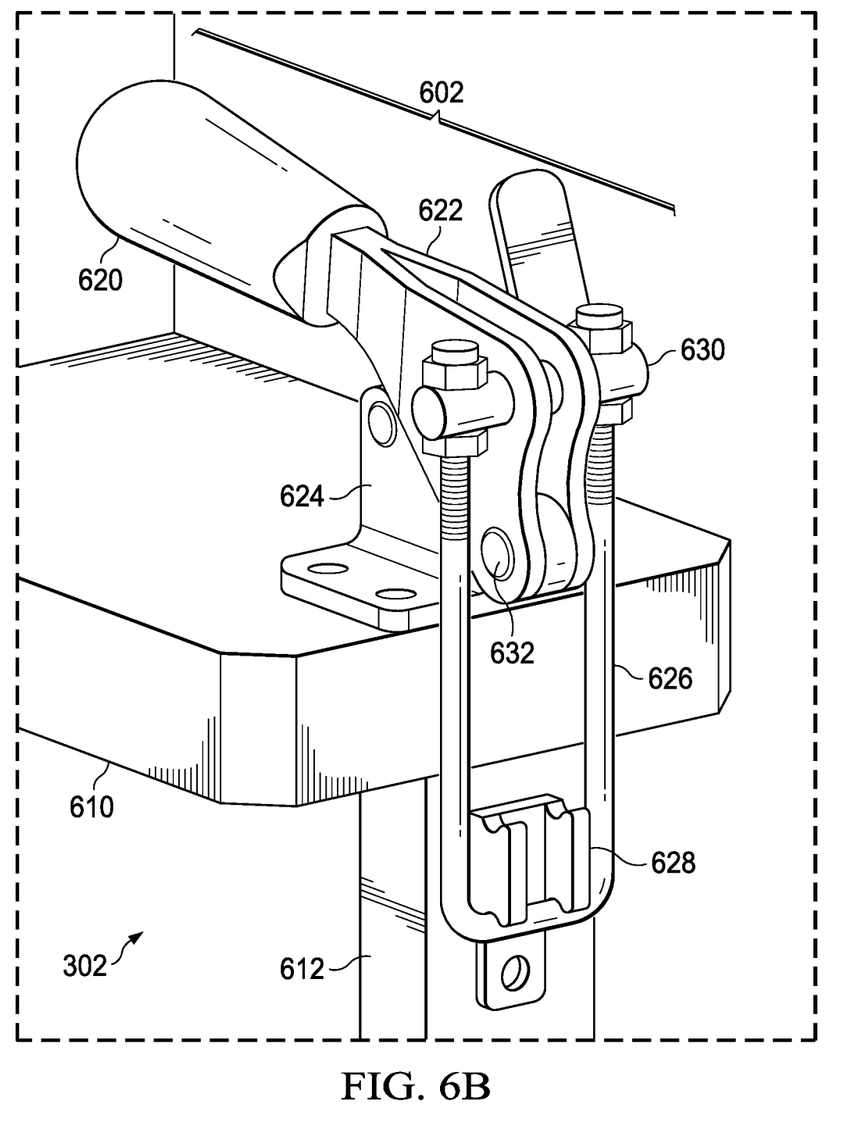
FIG. 6B is a perspective view illustrating a clamp latch according to some embodiments.

FIG. 6B is a perspective view illustrating a clamp latch 602 according to some embodiments. In some embodiments, the clamp latch 602 is a cam action latch, but in other embodiments, may be another type of latch, clamp or retaining structure that secures the upper clamp section 608 to the lower clamp section 616. The clamp latch 602 has a latch base 624 attached to an upper side of the upper clamp plate 610. A latch body 622 is secured to the latch base 624 by a hinge pin 632. The latch body 622 may have a handle 620 or the like for manual activation of the latch clamp 602. A latch loop 626 is attached to the latch body 622 by a loop pin 630. The latch loop 626 engages with a latch hook 628 on the clamp side plate 612 so that when the latch body 622 is lowered or rotated toward the upper clamp plate 610, the lower clamp section 616 is pulled toward, and secured against, the upper clamp section 608. In some embodiments, an end surface of the clamp side plates 612 may contact a lower surface of the upper clamp plate 610 when the lower clamp section 616 is secured to the upper clamp section 608.

Figure 7:
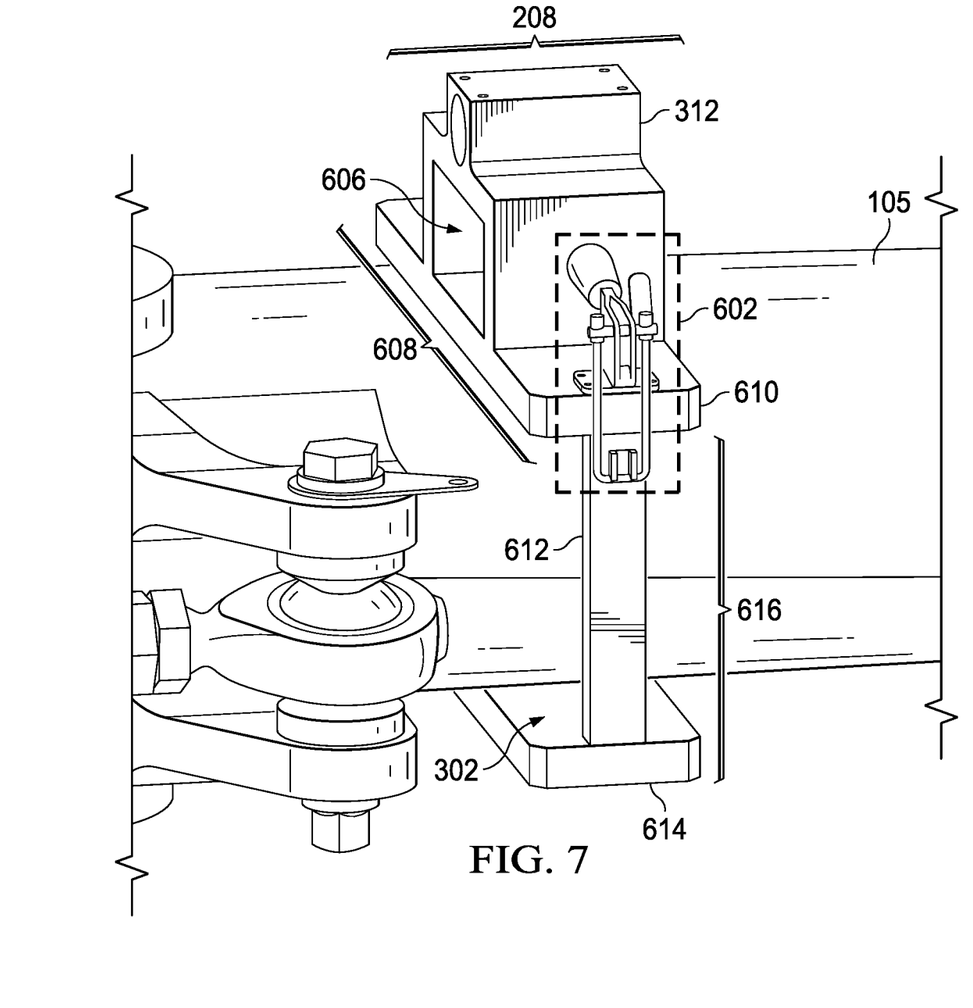
FIG. 7 is a perspective view illustrating a clamp body installed on a main rotor blade according to some embodiments.

FIG. 7 is a perspective view illustrating a clamp body 208 installed on a main rotor blade 105 according to embodiments. The clamp body 208 is installed on the main rotor blade 105, with the main rotor blade 105 extending through the clamp opening 302. The upper clamp section 608 is disposed over the main rotor blade 105, with the lower surface of the upper clamp plate 610 facing the main rotor blade 105. The lower clamp section 616 extends around the main rotor blade 105, with the upper surface of the lower clamp plate 614 facing the main rotor blade.

The clamp opening 302 may be substantially rectangular, and the clamp body 208 may be attached to the main rotor blade 105 near the root end of the main rotor blade 105. The root end of the main rotor blade 105 may have substantially flat sides, have flat portions, or be substantially square, so that the root end conforms to the shape of the yoke. Attaching the clamp body 208 at the root end of the main rotor blade 105 also permits the clamp to avoid the airfoil section of the main rotor blade 205, preventing damage to the most delicate portion of the main rotor blade 105.

Figure 8:
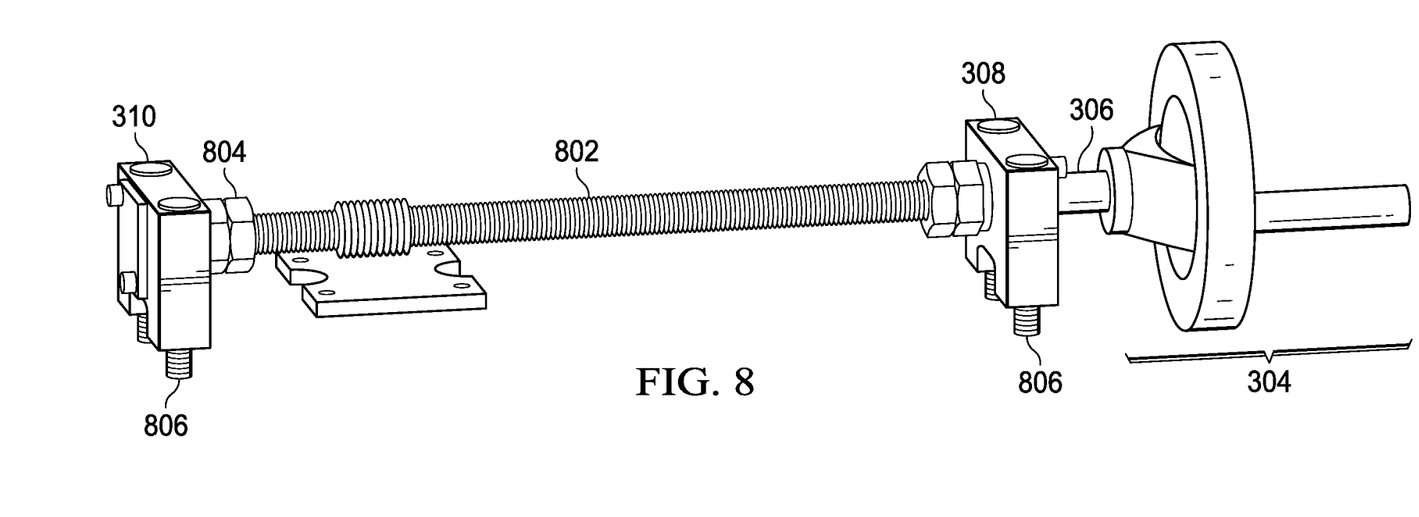
FIG. 8 is a perspective view illustrating an actuator according to some embodiments.

FIG. 8 is a perspective view illustrating an actuator 206 according to some embodiments. The actuator 206 has a shaft 306 that is borne on bearing blocks 308 and 310. A first end of the shaft 306 is carried in a forward bearing block 310, and the shaft 306 extends from the forward bearing block 310 through a rear bearing block 308. Each of the bearing blocks 308 and 310 may have fasteners 806 for attaching the bearing blocks 308 and 310 to the reaction plate. In various embodiments, the fasteners 806 may be pins, screws, bolts, clips, rivets, or the like.

The shaft 306 may be retained in the bearing blocks 308 and 310 by stops 804 disposed on the shaft 306. In some embodiments, the shaft 306 has a threaded portion 802 that may engage with threads of the traverse block to move the clamp body. Additionally, the stops 804 may be nuts disposed on a threaded portion 802 of the shaft 306 that keep the shaft 306 from sliding out of the bearing blocks 308 and 310 as the shaft 306 is rotated. In an embodiment where the actuator 206 is a manual screw advance actuator 206, the handwheel 304 may be disposed outside the rear bearing block 308 at a second end of the shaft 306 opposite the first end.

Figure 9:
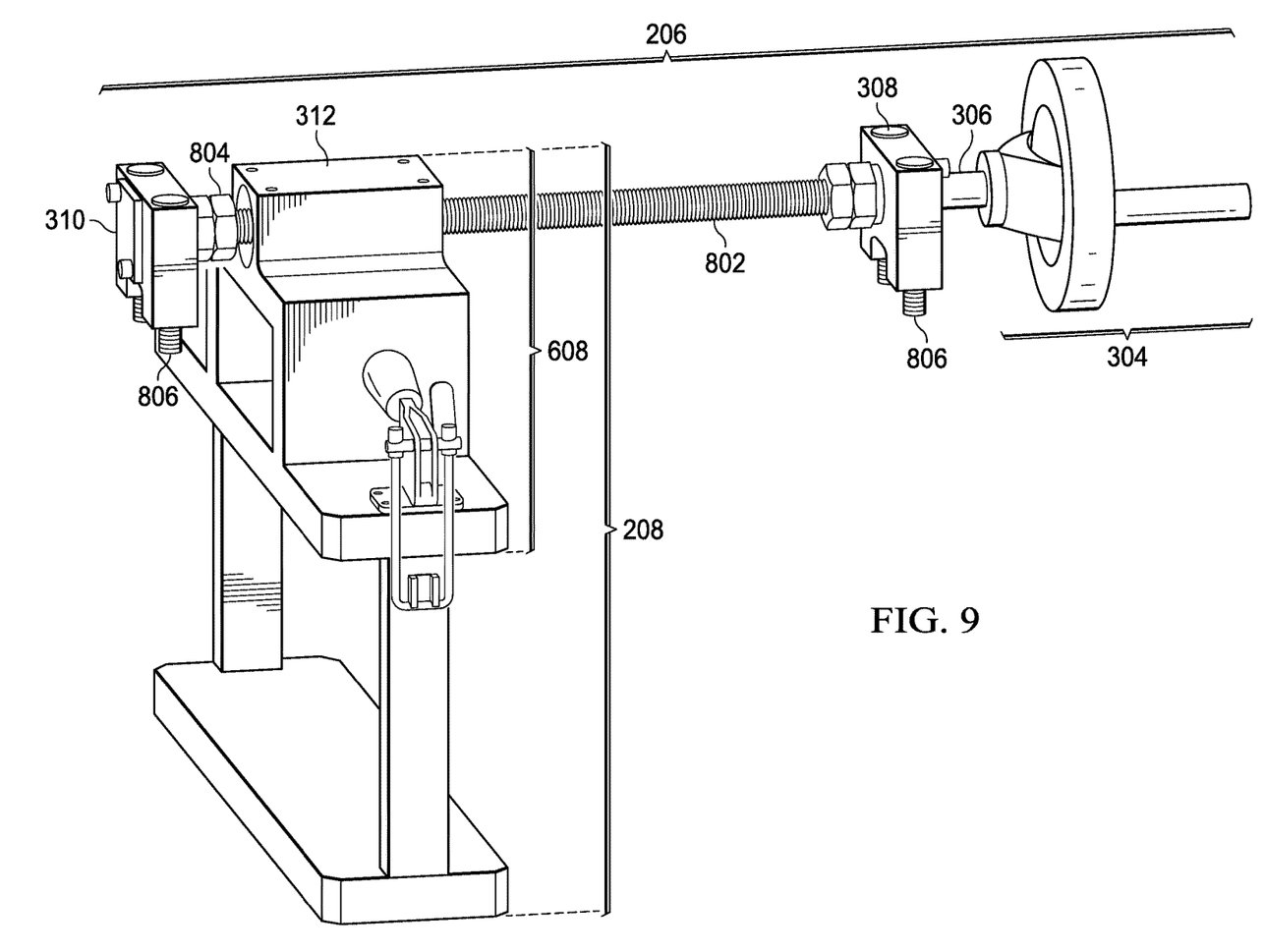
FIG. 9 is a perspective view illustrating an actuator disposed in a clamp body according to some embodiments.

FIG. 9 is a perspective view illustrating an actuator 206 disposed in a clamp body 208 according to embodiments. The shaft 306 may be disposed in the traverse block 312, with the traverse block 312 between the bearing blocks 308 and 310 so that the bearing blocks 308 and 310 or stops 804 act as end stops for the traverse block 312 as the actuator 206 is rotated and the clamp body 208 moves along the shaft 306.

Figure 10:
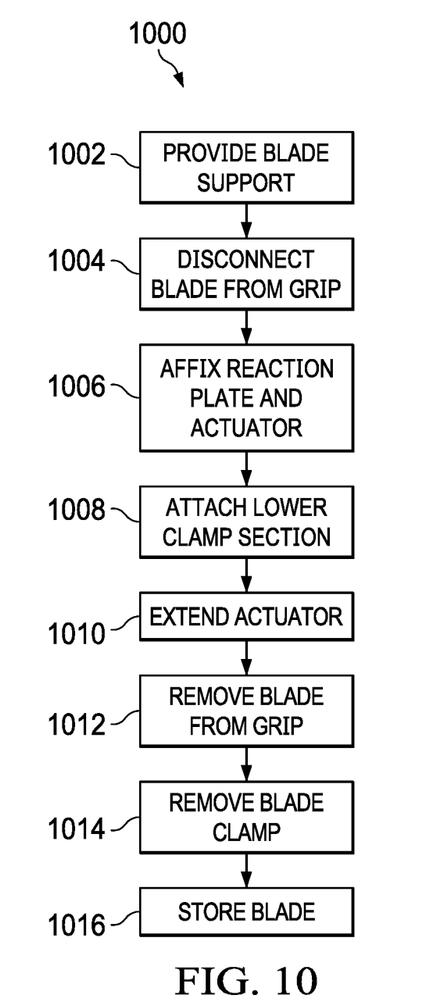
FIG. 10 is a flow diagram illustrating a method for removing a main rotor blade with a blade clamp according to some embodiments.

FIG. 10 is a flow diagram illustrating a method 1000 for removing a main rotor blade with a blade clamp according to some embodiments. In block 1002, a blade support is provided to support a main rotor blade during removal of the target main rotor blade to prevent the main rotor blade from shifting or falling when the main rotor blade clears the yoke. In some embodiments, the blade may be supported by a sling, chain, rope, or the like held by a support such as crane or like. In other embodiments, the main rotor blade may be supported by a scaffold, lift, or the like, or may be supported manually.

In block 1004, the main rotor blade is disconnected from the grip or yoke. The main rotor blade may be unfastened from the yoke, while remaining in place in the yoke. Fasteners that retain the main rotor blade in the grip of the yoke may be removed or otherwise disengaged. For example, in embodiments where the main rotor blade is bolted to the yoke, the main rotor blade bolts may be removed. In block 1006, the reaction plate and actuator are affixed to yoke. In some embodiments, the reaction plate pins are inserted into openings in the yoke, and the lip on the reaction plate may be abutted to an edge of the yoke. Additionally, the upper clamp section may be affixed to the reaction plate by the actuator, and affixing the reaction plate and actuator to the yoke will bring the upper clamp section over the main rotor blade. In block 1008, the lower clamp section is attached to the upper clamp section. The lower clamp section may be clamped, latched, or otherwise attached to the upper clamp section so that the main rotor blade extends through the clamp opening, and the clamp body grips the main rotor blade. In block 1010, the actuator is extended. In embodiments where the actuator is a screw advance actuator, the actuator may be rotated to move the clamp body away from the reaction plate pins and lip. Extending the actuator moves the main rotor blade along a long axis of the main rotor blade, out of the yoke, and in block 1012, the main rotor blade is removed from the grip of the yoke. In block 1014, the blade clamp is removed from the main rotor blade, and in block 1016, the blade is stored.

Figure 11:
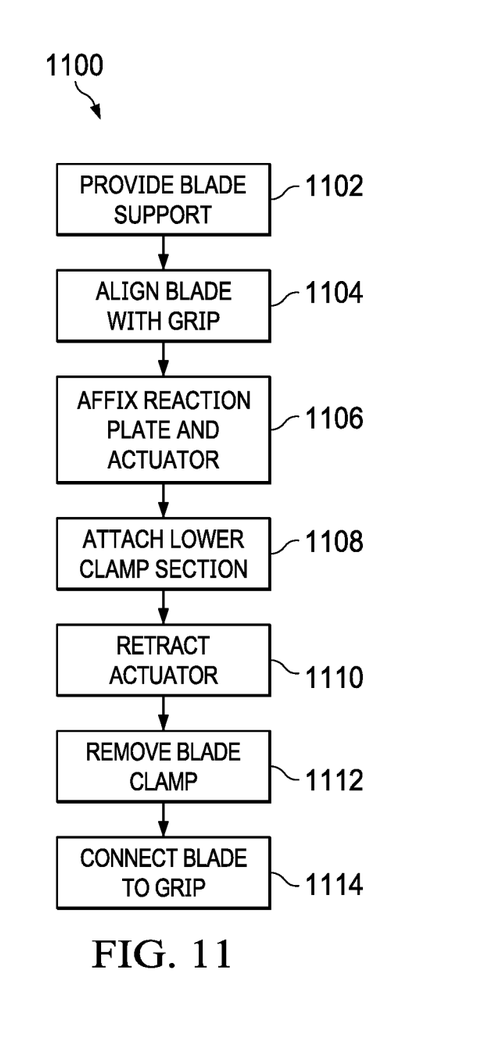
FIG. 11 is a flow diagram illustrating a method for installing a main rotor blade with a blade clamp according to some embodiments.

FIG. 11 is a flow diagram illustrating a method 1100 for installing a main rotor blade with a blade clamp according to some embodiments. The main rotor blade may be installed in the grip of a rotorcraft yoke a process that is substantially the reverse of the method for removing the rotor blade. In block 1102, support is provided for the main rotor blade, and in block 1104, the blade is aligned with the grip of a rotorcraft yoke. In block 1106, the reaction plate and actuator are affixed to the yoke. In some embodiments, pins of the reaction plate are inserted into holes, such as bolt holes, in the yoke. Additionally, a portion of the reaction plate extends over the main rotor blade. A portion of the clamp body, such as the upper clamp section, may be attached to the actuator, which is in turn, attached to the reaction plate, when the reaction plate is affixed to the yoke. In block 1108, the lower clamp section is attached to the upper clamp section, and is secured around the main rotor blade. In some embodiments, the lower clamp section it attached to the upper clamp section using latches, a strap, or the like, with the main rotor blade in the clamp opening. In block 1110 the actuator is retracted, and the blade is pulled into the grip or yoke. In embodiments where the actuator is a screw advance actuator, the actuator may be rotated to advance the traverse block toward the yoke, moving the clamp body and main rotor blade toward the yoke. In block 1123, the blade clamp is removed, and in block 1114, the blade is connected to the grip. For example, after the blade clamp is removed from the bolt holes of the yoke, one or more bolts may be put into, and secured within, the bolt holes.

An embodiment device includes a clamp body having a clamp opening, an extension opening and a traverse block having an internally threaded portion, a reaction plate having a recess in a first face at a first side of the reaction plate and one or more pins disposed in the recess extending away from the first face, and further having an extension extending along a long axis of the reaction plate through the extension opening, and bearing blocks disposed on a second side of the reaction plate opposite the first side, where the traverse block is disposed between the bearing blocks. An actuator is aligned parallel to the long axis of the reaction plate and extending through each of the bearing blocks and through the traverse block, and the actuator has an eternally threaded portion engaged with the internally threaded portion of the clamp body.

In some embodiments, the reaction plate further has a lip formed by the recess. In some embodiments, the lip is countered to have a curve. In some embodiments, the lip is contoured with one or more coves, and each cove of the one or coves is associated with a pin of the one or more pins. In some embodiments, the extension opening is disposed between the clamp opening and the bearing block. In some embodiments, the clamp body has an upper clamp section and a lower clamp section, the clamp opening is formed by the upper clamp section and the lower clamp section, and the upper clamp section has an upper clamp plate and one or more attachment structures disposed on the upper clamp plate. In some embodiments, the upper clamp section has an upper clamp plate having a lower surface facing the clamp opening, the one or more attachments structures include one or more clamp latches disposed on an upper surface of the upper clamp plate, and the lower clamp section has one or more clamp hooks, and each clamp hook of the one or more clamp hooks is associated with a respective one of the one or more clamp latches.

An embodiment device includes a clamp body having a clamp opening, an extension opening, with the clamp body configured to clamp a rotor blade within the clamp opening. THE device further includes a reaction plate having an attachment structure disposed at a first face, the attachment structure configured to engage with a yoke of a rotorcraft along an axis perpendicular to a long axis of the reaction plate, and an actuator connected to the reaction plate and connected to the clamp body, where the actuator is configured to move the clamp body and the rotor blade with respect to the reaction plate when the actuator is engaged.

In some embodiments, the device further includes bearing blocks attached to the reaction plate, where the bearing blocks connect the actuator to the reaction plate. In some embodiments, the clamp body includes a traverse block, a the traverse block connects the actuator to the clamp body. In some embodiments, the traverse block has a first threaded portion and the actuator has a second threaded portion configured to engage the first threaded portion of the traverse block, and the actuator is further configured to move the clamp body and the rotor blade with respect to the reaction plate when the actuator is engaged by rotating the actuator. In some embodiments, the attachment structure comprises one or more pins extending from the first face and perpendicularly to the long axis of the reaction plate, and the pins are configured to engage holes in the yoke of the rotorcraft. In some embodiments, the attachment structure further includes a lip formed by a recess in the first face, where the lip is configured to engage an edge of the yoke. In some embodiments, the lip is contoured to conform to the edge of the yoke.

An embodiment method includes affixing a reaction plate of a blade clamp to a yoke of a rotorcraft, attaching a lower clamp section of a clamp body of the blade clamp around a rotor blade and to an upper clamp section that is of the clamp body and that is attached to the reaction plate, and engaging an actuator that is attached to the reaction plate and to the clamp body, the engaging the actuator causing the rotor blade to move with respect to the yoke.

In some embodiments, the engaging the actuator includes rotating the actuator manually or using a powered system, and moving the clamp body and the rotor blade with respect to the yoke. In some embodiments, the reaction plate has pins extending away from a face of the reaction plate, and the affixing the reaction plate to the yoke includes engaging the pins in corresponding holes in the yoke. In some embodiments, the method further includes unfastening the rotor blade from the yoke by removing bolts from the holes in the yoke, and the engaging the actuator includes moving the rotor blade away from, and out of, the yoke. In some embodiments, the reaction plate has a lip with a first contour, and the affixing the reaction plate to the yoke further includes engaging the lip against an edge of the yoke having a second contour complimentary to the first contour. In some embodiments, the affixing the reaction plate to the yoke includes affixing the reaction plate to the yoke while the rotor blade is out the yoke, where the engaging the actuator includes moving the rotor blade toward the yoke and moving a root end of the rotor blade into the yoke.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising
a clamp body having a clamp opening, an extension opening and a traverse block having an internally threaded portion;
a reaction plate having a recess in a first face at a first side of the reaction plate and one or more pins disposed in the recess extending away from the first face, and further having an extension extending along a long axis of the reaction plate through the extension opening; and
bearing blocks disposed on a second side of the reaction plate opposite the first side, wherein the traverse block is disposed between the bearing blocks; and
an actuator aligned parallel to the long axis of the reaction plate and extending through each of the bearing blocks and through the traverse block, wherein the actuator has an externally threaded portion engaged with the internally threaded portion of the clamp body.

2. The device of claim 1, wherein the reaction plate further has a lip formed by the recess.

3. The device of claim 2, wherein the lip is contoured to have a curve.

4. The device of Claim 3, wherein the lip is contoured with one or more coves, wherein each cove of the one or coves is associated with a pin of the one or more pins.

5. The device of claim 1, wherein the extension opening is disposed between the clamp opening and the bearing block.

6. The device of claim 1, wherein the clamp body comprises an upper clamp section and a lower clamp section, wherein the clamp opening is formed by the upper clamp section and the lower clamp section, and wherein the upper clamp section comprises an upper clamp plate and one or more attachment structures disposed on the upper clamp plate.

7. The device of claim 6, wherein the upper clamp section has an upper clamp plate having a lower surface facing the clamp opening, wherein the one or more attachments structures comprise one or more clamp latches disposed on an upper surface of the upper clamp plate, wherein the lower clamp section has one or more clamp hooks, and wherein each clamp hook of the one or more clamp hooks is associated with a respective one of the one or more clamp latches.

8. A device, comprising:
a clamp body having a clamp opening, an extension opening, wherein the clamp body is configured to clamp a rotor blade within the clamp opening;
a reaction plate having an attachment structure disposed at a first face, the attachment structure configured to engage with a yoke of a rotorcraft along an axis perpendicular to a long axis of the reaction plate; and an actuator connected to the reaction plate and connected to the clamp body, wherein the actuator is configured to move the clamp body and the rotor blade with respect to the reaction plate when the actuator is engaged.

9. The device of claim 8, further comprising bearing blocks attached to the reaction plate, wherein the bearing blocks connect the actuator to the reaction plate.

10. The device of claim 8, wherein the clamp body comprises a traverse block, wherein the traverse block connects the actuator to the clamp body.

11. device of claim 10, wherein the traverse block has a first threaded portion and the actuator has a second threaded portion configured to engage the first threaded portion of the traverse block, wherein the actuator is further configured to move the clamp body and the rotor blade with respect to the reaction plate when the actuator is engaged by rotating the actuator.

12. The device of claim 8, wherein the attachment structure comprises one or more pins extending from the first face and perpendicularly to the long axis of the reaction plate, and wherein the pins are configured to engage holes in the yoke of the rotorcraft.

13. The device of claim 12, wherein the attachment structure further comprises a lip formed by a recess in the first face, wherein the lip is configured to engage an edge of the yoke.

14. The device of claim 13, wherein the lip is contoured to conform to the edge of the yoke.

15. A method, comprising:
affixing a reaction plate of a blade clamp to a yoke of a rotorcraft;
attaching a lower clamp section of a clamp body of the blade clamp around a rotor blade and to an upper clamp section that is of the clamp body and that is attached to the reaction plate; and
engaging an actuator that is attached to the reaction plate and to the clamp body, the engaging the actuator causing the rotor blade to move with respect to the yoke.

16. The method of claim 15, wherein the engaging the actuator comprises rotating the actuator manually or using a powered system, and moving the clamp body and the rotor blade with respect to the yoke.

17. The method of claim 15, wherein the reaction plate has pins extending away from a face of the reaction plate, and wherein the affixing the reaction plate to the yoke comprises engaging the pins in corresponding holes in the yoke.

18. The method of claim 17, further comprising unfastening the rotor blade from the yoke by removing bolts from the holes in the yoke, wherein the engaging the actuator comprises moving the rotor blade away from, and out of, the yoke.

19. The method of claim 18, wherein the reaction plate has a lip with a first contour, and wherein the affixing the reaction plate to the yoke further comprises engaging the lip against an edge of the yoke having a second contour complimentary to the first contour.

20. The method of claim 17, wherein the affixing the reaction plate to the yoke comprises affixing the reaction plate to the yoke while the rotor blade is out the yoke, wherein the engaging the actuator comprises moving the rotor blade toward the yoke and moving a root end of the rotor blade into the yoke.

* * * * *